(12) United States Patent
Plaumann et al.

(10) Patent No.: US 7,539,460 B2
(45) Date of Patent: May 26, 2009

(54) METHOD AND TESTER FOR DETERMINING AN ERROR RATE OF A MOBILE-TELEPHONE DEVICE, ESPECIALLY FOR USF-BLER

(75) Inventors: Ralf Plaumann, Forstern (DE); Joerg Fuessle, Poing (DE); Peter Seelbach, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 221 days.

(21) Appl. No.: 10/555,989

(22) PCT Filed: Mar. 4, 2004

(86) PCT No.: PCT/EP2004/002219

§ 371 (c)(1),
(2), (4) Date: Nov. 8, 2006

(87) PCT Pub. No.: WO2004/100459

PCT Pub. Date: Nov. 18, 2004

(65) Prior Publication Data

US 2007/0093211 A1   Apr. 26, 2007

(30) Foreign Application Priority Data

May 8, 2003   (DE) ................. 103 20 670

(51) Int. Cl.
*H04B 7/00* (2006.01)
*H04B 17/00* (2006.01)
*H03C 1/62* (2006.01)
(52) U.S. Cl. ............ 455/67.14; 455/67.11; 455/69; 455/115.1; 455/115.2; 455/226.1; 455/423; 370/235; 370/329; 370/330; 370/347; 370/337; 370/442

(58) Field of Classification Search ............. 455/67.11, 455/67.14, 69, 115.1, 115.2, 226.1, 423; 370/235, 329, 330, 347, 337, 442
See application file for complete search history.

(56) References Cited

U.S. PATENT DOCUMENTS 5,729,534 A * 3/1998 Jokinen et al. ............. 370/280

(Continued)

FOREIGN PATENT DOCUMENTS

| DE | 100 31 539 A1 | 1/2002 |
| DE | 100 65 937 A1 | 5/2002 |
| EP | 1 139 614 A1 | 4/2001 |

OTHER PUBLICATIONS

Richard Macquire, "Monitoring GPRS performance", Feb. 2001, pp. 1-3, XP002303572, internet: URL:http://www.telecommagazine.com/articles.*

(Continued)

*Primary Examiner*—Lana N. Le
*Assistant Examiner*—Ping Y Hsieh
(74) *Attorney, Agent, or Firm*—Ditthavong Mori & Steiner, P.C.

(57) ABSTRACT

A method and apparatus for determining an error rate is described, in which a transmission block having an allocation signal is received by a mobile communications device that is to be tested. The device checks whether it has been allocated the following transmission block by the received allocation signal. If an allocation is determined, a message signal is transmitted by the device to the tester in the following transmission block. It is then determined whether the device has received a message signal in the following transmission block after an allocation signal, which is addressed to the device. The number of allocation signals addressed to the device which have not been recognized is then determined, wherein the allocation signal to be transmitted is selected from an allocation signal addressed to the device and at least another allocation signal addressing another mobile communications device of the same transmission signal.

17 Claims, 3 Drawing Sheets

U.S. PATENT DOCUMENTS

| | | | | |
|---|---|---|---|---|
| 6,501,745 | B1* | 12/2002 | Turina et al. | 370/337 |
| 6,707,808 | B1* | 3/2004 | Vedrine | 370/337 |
| 6,959,406 | B2* | 10/2005 | Goldsack et al. | 714/704 |
| 7,068,623 | B1* | 6/2006 | Barany et al. | 370/329 |
| 7,212,542 | B2* | 5/2007 | Khawand | 370/464 |
| 2002/0141359 | A1* | 10/2002 | Jei | 370/329 |
| 2002/0181422 | A1* | 12/2002 | Parantainen et al. | 370/337 |
| 2003/0156546 | A1* | 8/2003 | Demetrescu et al. | 370/252 |

OTHER PUBLICATIONS

Agilent Technologies, Agilent Technologies 8960 Series 10 Wireless Communications Test Set, Agilent Technologies E1968A GSM/GPRS Mobile Test Application, Reference Guide, Feb. 1, 2003, pp. 1-32, 149, 213, URL:http://wireless.agilnet.com/find/8960>, Agilent Technologies—Learning Products Department, Liberty Lake, WA, USA.

Agilent Technologies,Uplink State Flag (USF), E1968A E6701C E6704A Online User's Guide, Jun. 12, 2003, http://wireless.agilent.com/rfcomms/refdocs/gsmgprs/gprsla pe usf.php,retrieved Jan. 11, 2004, pp. 1-1, Agilent Technologies, USA.

Agilent Technologies,Uplink State Flag (USF) BLER, ), E1968A E6701C E6704A Online User'Guide Jun. 4, 2003, http://wireless.agilent.com/rfcomms/refdocs/gsmgprs/gprsla usf bler.phop, retrieved Jan. 11, 2004, pp. 1-1, Agilent Technologies, USA Richard Macquire, Monitoring GPRS Performance, Telecommagazine, Feb. 1, 2001, pp. 1-3, URL:http://www.telecommagazine.com/articles>, retrieved on Nov. 1, 2004!

International Preliminary Report on Patentability, PCT, Apr. 6, 2006.

* cited by examiner

METHOD AND TESTER FOR DETERMINING AN ERROR RATE OF A MOBILE-TELEPHONE DEVICE, ESPECIALLY FOR USF-BLER

FIELD OF THE INVENTION

The invention relates to a method and a tester for determining an error rate of a mobile-telephone device with a recognition of an assignment signal.

BACKGROUND OF THE INVENTION

The use of one transmission channel for several mobile telephone subscribers and/or mobile-telephone devices in order to increase the transmission capacity of a mobile telephone system is already known. Within this one transmission channel, a base station informs the mobile-telephone devices, which of the several mobile-telephone devices is in communication with the base station at which time.

For example, each transmission block, which is transmitted by the base station using an assignment signal, that is, a so-called "USF" (Uplink State Flag), specifies which of the mobile-telephone devices communicating with the base station in the same transmission channel can transmit to the base station during the next transmission block. A flexible assignment of this kind is described, for example, in published European Patent Application EP 1 139 614 A1. In this context, the transmission channel, which consists of a successive series of transmission blocks, is used by up to eight subscribers.

To ensure a smooth operation in such a system, which offers a considerable improvement in the exploitation of the transmission capacity of the transmission channel by comparison with a fixed assignment of a transmission channel to one subscriber, the assignment by the mobile-telephone devices must take place with a considerable degree of security. All such mobile-telephone devices are terminal devices, which communicate with the base station. In the event of a non-recognition of such an assignment signal by a mobile-telephone device, only a part of the potential transmission capacity remains unused; however, considerably greater difficulties arise in the event of an incorrect recognition by a mobile-telephone device. In the latter case, at least two mobile-telephone devices transmit simultaneously to the base station in a subsequent transmission block, and accordingly, the information communicated can, under some circumstances, no longer be evaluated.

In developing mobile-telephone devices and in developing the testing of devices in production, it is therefore necessary to determine the unrecognized assignments and to compare them with the total number of assignment signals received. For an error rate determined in this manner (BLER, Block Error Rate), a maximum-permissible limit of one percent has been established, for example, in the specification for an EGPRS system.

SUMMARY OF THE INVENTION

There exists a need to provide a method and a tester for determining an error rate, which allows a practice-oriented determination of the error rate.

In accordance with one aspect of the present invention, in order to determine the error rate of the mobile-telephone system with recognition of an assignment signal, a transmission block is initially transmitted to the mobile-telephone device with an assignment signal contained in the transmission block. The mobile-telephone device under test receives the signal including the assignment signal contained therein and checks the address of the assignment signal. In this context, if the mobile-telephone device establishes that the assignment signal is addressed to the mobile-telephone device itself, this mobile-telephone device transmits a message signal to the base station in the subsequent transmission block.

Conversely, if no assignment signal, which is addressed to this mobile-telephone device, is recognized when checking the assignment signal contained in the transmission block is received, the mobile-telephone device under test transmits no message signal at precisely this time during the subsequent transmission block. For the mobile-telephone device under test, this result is synonymous with another mobile-telephone device of the same transmission channel being addressed by the assignment signal, and therefore means that the mobile-telephone device under test should not transmit in the subsequent transmission block.

In order to determine the quality of recognition of the assignment signal by the mobile-telephone device, the number of transmission blocks, in which the mobile-telephone device under test should have transmitted, but in which no message signal was transmitted by the mobile-telephone device under test, is determined. Moreover, in order to prevent the exclusive use of assignment signals, which address the mobile-telephone device under test, the assignment signal to be transmitted is selected from at least two different assignment signals, one of these assignment signals being addressed to the mobile-telephone device under test, and at least one further assignment signal being addressed to another mobile-telephone device of the same transmission channel. With this selection from at least two mutually different assignment signals, it is more difficult for the mobile-telephone device to identify a sequence of incoming assignment signals as a test. The test result is therefore more comparable with real operating conditions.

In one embodiment, it is particularly advantageous to determine not only the magnitude of the error rate for an assignment signal, which relates to the mobile-telephone device under test, but also the magnitude of the rate for an incorrect recognition of assignment signals, which address another mobile-telephone device of the same transmission channel. It is possible to determine both error rates at the same time by using at least two assignment signals, one of which addresses the mobile-telephone device under test, and the other of which addresses another mobile-telephone device using the same transmission channel.

This not only simplifies the handling of the tester and therefore also the implementation of the method for determining an error rate, but, at the same time, allows the implementation of a test, which is adapted in an improved manner to the real operating conditions of a mobile telephone and which therefore especially provides a statistically-valuable measured result.

According to another advantageous embodiment, the number of transmitted assignment signals, which address the mobile-telephone device under test, is in a given ratio to the totalc number of transmitted assignment signals, wherein the ratio can preferably be determined by the user.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The method according to the invention and the tester according to the invention are explained in greater detail below with reference to the drawings. The drawings are as follows.

DETAILED DESCRIPTION OF THE PREFERRED EMBODIMENT

Figure 1:
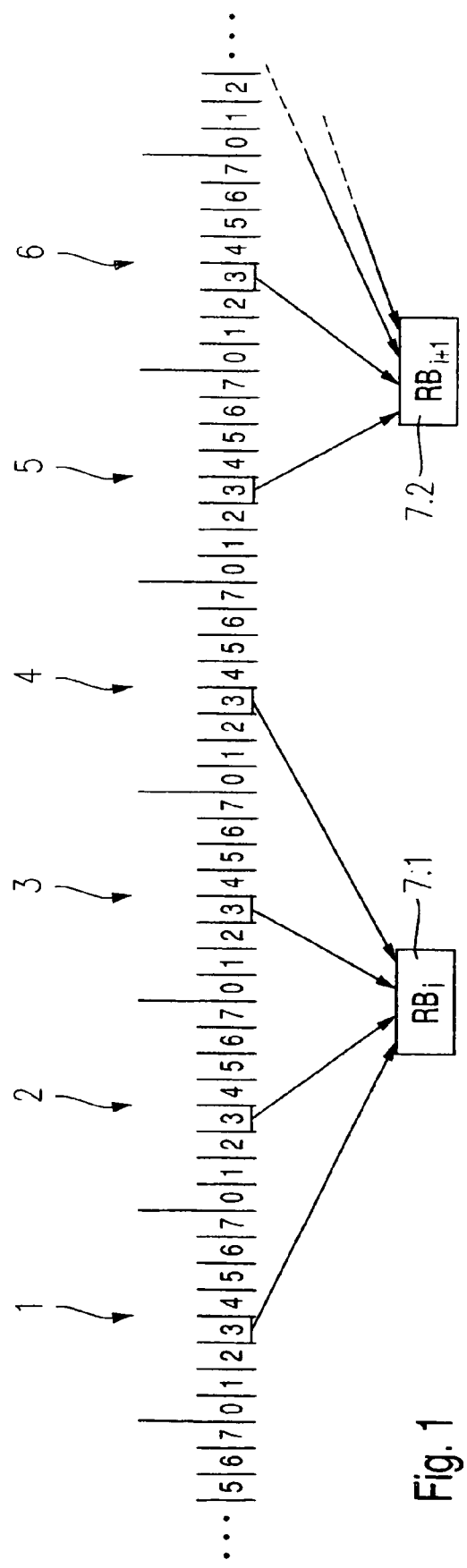
FIG. 1 shows a schematic presentation of the formation of transmission blocks in a mobile telephone system.

FIG. 1 shows, by way of example, the procedure for a transmission of message signals in a mobile telephone system. For example, in the case of EGPRS (Enhanced General Packet Radio System) mobile-telephone systems, fixed structures repeated over time are used for the transmission of message signals. In FIG. 1, this is shown for the illustrated time segment by six successive frames 1 to 6.

Further subdivisions of time are provided within a frame of this kind, so that each frame 1 to 6 is composed of timeslots numbered 0 to 7. Communication, for example, between a base station and a subscriber with a mobile-telephone device (subscriber equipment), takes place respectively in a given timeslot 0 to 7 of a frame 1 to 6.

A given number for a timeslot 0 to 7 through all successive frames 1 to 6 as well as the other frames, which are not shown in FIG. 1, forms a transmission channel, within which a signal can be transmitted between a mobile-telephone device and a base station. The transmission of information between a mobile-telephone device and the base station takes place in transmission blocks 7.1 and 7.2, wherein each of these transmission blocks consists of four corresponding timeslots of four successive frames 1 to 6.

In the illustration of FIG. 1, each transmission block 7.1 ($RB_i$) is therefore formed from the number 3 timeslots in the subsequent frames 1, 2, 3 and 4. The next transmission block 7.2 ($RB_{i+1}$) of the same transmission channel starts from timeslot number 3 in frame 5. In addition to this next transmission block 7.2 ($RB_{i+1}$), FIG. 1 also shows timeslot number 3 of frame 6; the association of two further number 3 timeslots of two further frames is indicated by the dotted-line arrows.

In order to guarantee an optimum exploitation of the transmission capacity of the transmission channel, successive transmission blocks of a transmission channel can be used by different subscribers or subscriber equipment. This exploits the fact, that the capacity of an entire transmission channel is not required for a transmission of simple information, such as speech signals. Accordingly, several mobile-telephone devices are operated jointly within one transmission channel, the individual transmission blocks each being assigned to exactly one mobile-telephone device. This assignment prevents an overlapping of message signals from two or more mobile-telephone devices.

Figure 2:
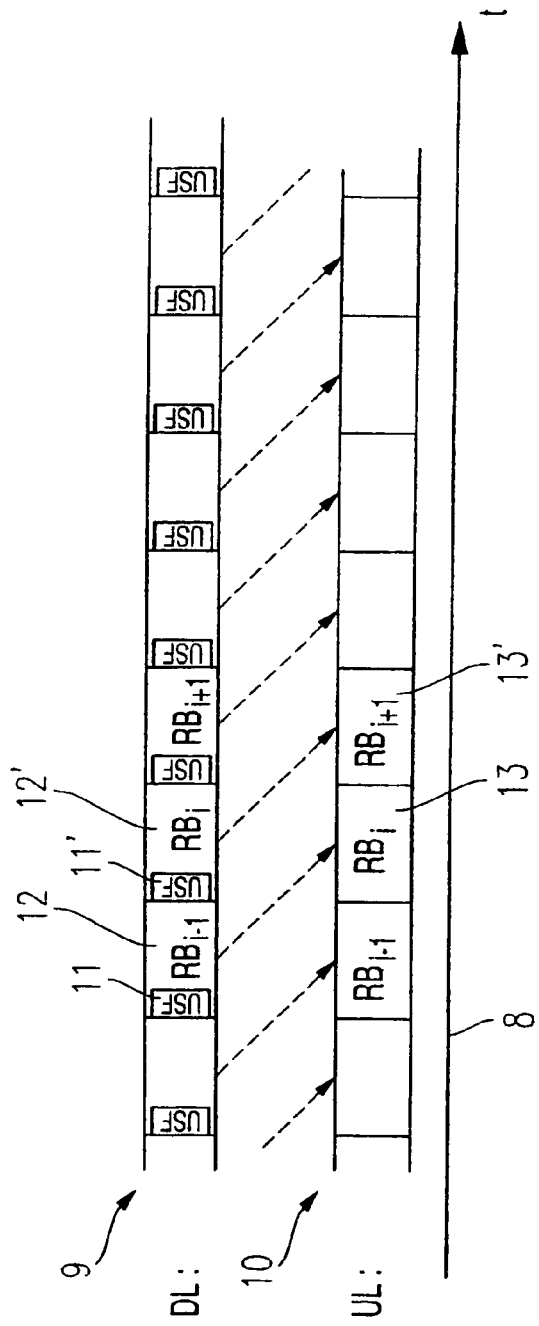
FIG. 2 shows a schematic presentation of the time course for a transmission of several transmission blocks with assignment signals.

FIG. 2 shows in a much simplified form the time course and the assignments of the individual transmission blocks to the mobile telephone subscribers. With reference to a time axis 8, FIG. 2 shows a downlink signal (DL) 9, which consists of several successive transmission blocks. FIG. 2 also shows an uplink signal (UL) 10, which also consists of several successive transmission blocks.

The downlink signal 9 is a signal transmitted by a base station to a mobile-telephone device. The uplink signal 10 is transmitted from a mobile-telephone device to the base station. In order to establish which of the mobile-telephone devices can communicate with the base station in a subsequent transmission block, preferably the next transmission block, an assignment signal 11 (USF), which addresses one of the mobile-telephone devices of the same transmission channel, is contained in each of the transmission blocks of the downlink signal 9. The mobile-telephone devices of the same transmission channel evaluate this assignment signal 11, which is transmitted, for example, in the transmission block marked with the reference symbol 12.

During the subsequent transmission block 13, the mobile-telephone device, which was addressed by the assignment signal 11 of the transmission block 12 ($RB_{i+1}$), transmits a message signal to the base station. A subsequent transmission block 12' ($RB_i$) of the downlink signal 9 once again contains an assignment signal 11', with which a mobile-telephone device is addressed for the subsequent transmission block 13' ($RB_{i+i}$) of the uplink signal 10. The two assignment signals 11 and 11' can address either the same mobile-telephone device or different mobile-telephone devices of the same transmission channel.

Figure 3:
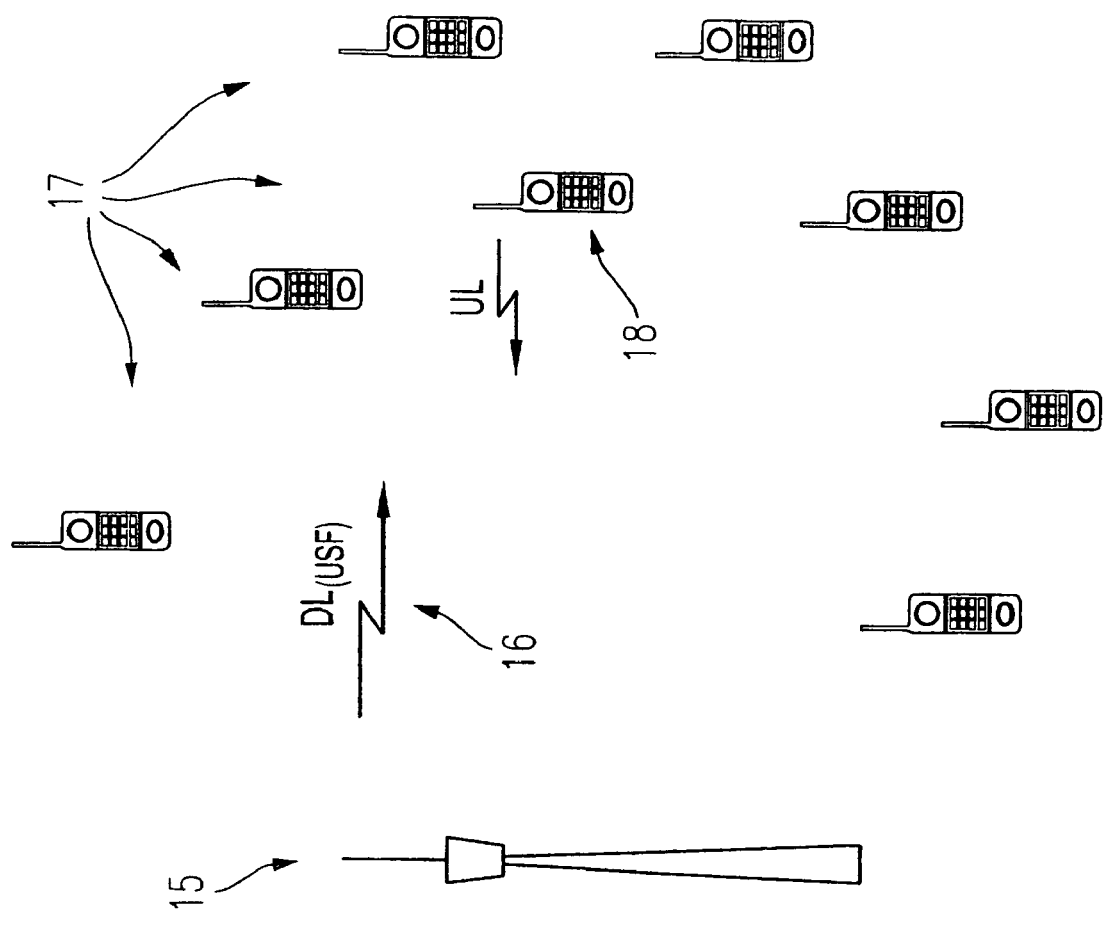
FIG. 3 shows a schematic presentation of a mobile telephone system with several mobile-telephone devices of one transmission channel.

FIG. 3 shows the real operation of such a mobile telephone system in much simplified form. An assignment signal (USF), with which one of the mobile-telephone devices 17, which uses the same transmission channel, is addressed, is contained in each of the transmission blocks, which are transmitted as a downlink signal 16 from a base station 15. For example, if the mobile-telephone device 18 recognizes, during the evaluation of the last-transmitted assignment signal, that it has been addressed, it transmits a message signal to the base station 15 in the subsequent transmission block. In view of the definition of the transmission channel with, for example, up to 8 mobile-telephone devices, an accurate evaluation of the transmitted assignment signals is of great importance for the smooth functioning of the system. With a specified reference level, an error rate, for example, of less than one percent (1%) is therefore required in accordance with the standard for EGPRS for the recognition of an assignment signal by the mobile-telephone device.

In order to determine this error rate, the assignment signal 11, which addresses either the mobile-telephone device, for which the error rate is to be determined, or another mobile-telephone device, which belongs to the same transmission channel, is transmitted in transmission block 12 ($RB_{i+1}$) as shown in FIG. 2. If the mobile-telephone device under test is addressed by the assignment signal 11, a tester, as presented in FIG. 4, determines for the subsequent transmission block 13 ($RB_{i+1}$) of the uplink signal 10 whether the mobile-telephone device under test has transmitted a message signal. To determine the error rate, the number of transmission blocks, in which a message signal should have been communicated by the mobile-telephone device under test, because the mobile-telephone device under test was addressed by the assignment signal in the preceding transmission block of the downlink signal 9, is determined.

From this number of unrecognized assignment signals addressing the mobile-telephone device under test, a first error rate is determined by comparing the number of unrecognized assignment signals with the number of assignment signals addressing the mobile-telephone device under test.

Before the next transmission block 12' ($RB_i$) of the downlink signal 9 is transmitted, it is first determined whether the assignment signal 11' contained in the next transmission block 12' ($RB_i$) is supposed to address the mobile-telephone device under test or another mobile-telephone device of the same transmission channel. This decision, regarding which assignment signal is transmitted next, can also take into consideration how many assignment signals addressing the mobile-telephone device under test have already been transmitted, or, whether the last-transmitted assignment signal addresses the mobile-telephone device under test or not.

In selecting the assignment signal to be transmitted, further selection criteria can also be determined.

If an assignment signal 11', which does not address the mobile-telephone device under test, is transmitted in the next transmission block 12' ($RB_i$) of the downlink signal 9, it is determined for the subsequent transmission block 13' ($RB_{i+1}$) of the uplink signal 10, whether the mobile-telephone device under test has transmitted a message signal. In this context, the number of transmission blocks, in which a message signal was transmitted by the mobile-telephone device under test, although another mobile-telephone device was addressed in the preceding transmission block of the downlink signal 9, is determined.

In a similar manner to the first error rate, a second error rate is determined from the number of these incorrectly-recognized assignment signals. This determination of the first and the second error rate preferably does not take place through two separate measurements implemented one after the other, but rather through an evaluation of the transmission blocks of the uplink signal 10 taking into consideration the assignment signals contained respectively in the preceding transmission block of the downlink signal 9.

By particular preference, the next assignment signal to be transmitted is not selected on the basis of the assignment signal, which addresses the mobile-telephone device under test and a further assignment signal, but rather on the basis of the entire group of assignment signals, with which all of the mobile-telephone devices, using the same transmission channel are addressed.

Figure 4:
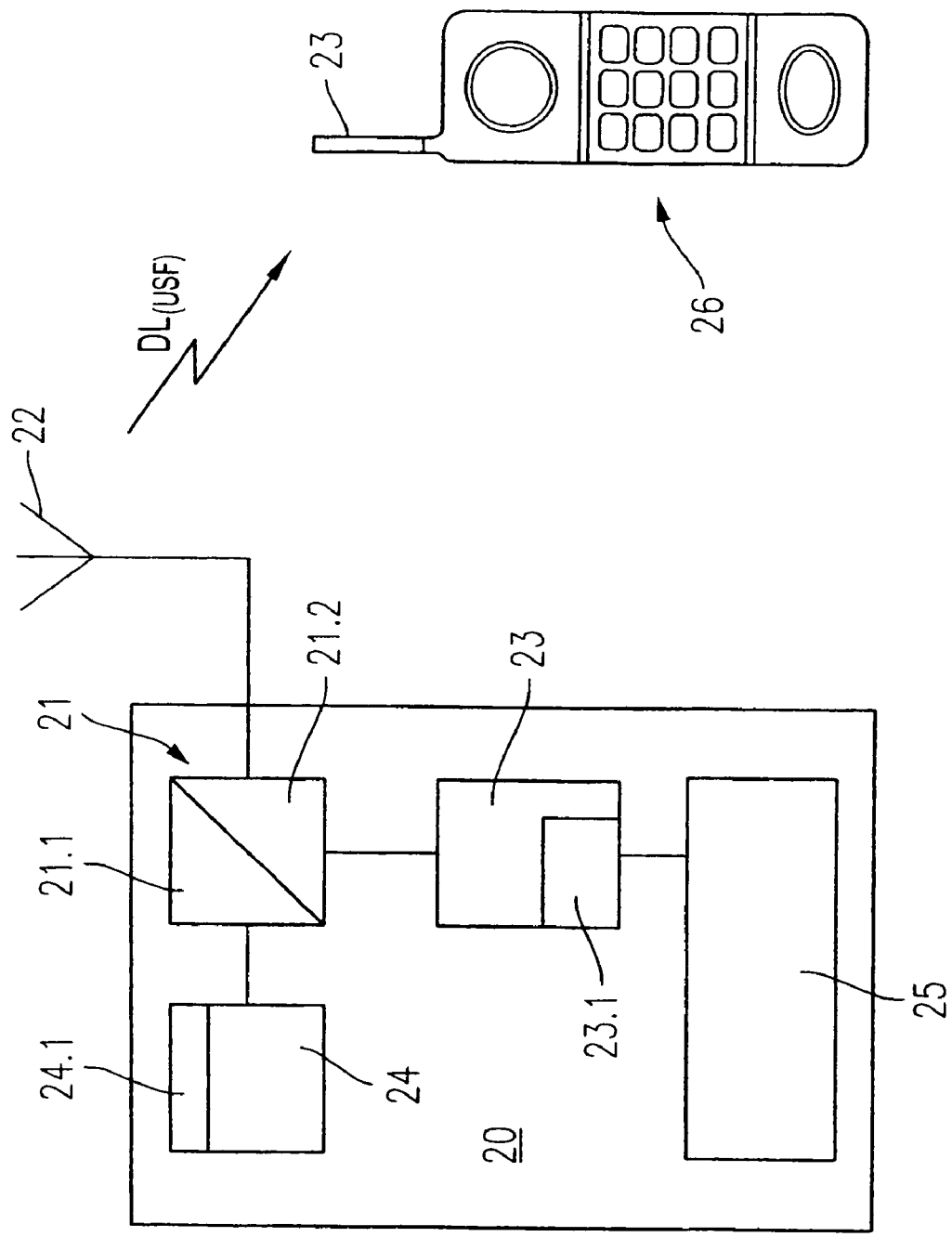
FIG. 4 shows a block circuit diagram of a tester for determining an error rate of a mobile-telephone device.

FIG. 4 shows in a much simplified form a block circuit diagram for a tester 20 according to the invention. The tester 20 comprises a transmitter/receiver device 21 which is connected to an antenna 22. On the one hand, the downlink signal 9 is transmitted via the antenna 22 and, on the other hand, the uplink signal 10 is received via the antenna 22. For transmission and reception respectively, the transmitter/receiver device 21 consists of a transmitter unit 21.1 and a receiver unit 21.2.

An evaluation device 23, in which the number of unrecognized assignment signals, which address the mobile-telephone device under test, and also the number of incorrectly-recognized assignment signals, which address mobile-telephone devices other than the mobile-telephone device under test, are determined, is connected to the transmitter/receiver device 21.

Furthermore, the evaluation device 23 contains means 23.1 for determining a first or respectively second error rate from the number of unrecognized assignment signals or respectively incorrectly-recognized assignment signals. The first error rate and/or the second error rate determined in the evaluation device 23 are displayed on a display device 25, which is connected to the evaluation device 23. The display can be both graphical and also in the form of text.

The assignment signals to be transmitted by the transmitter device 21.1 in each transmission block of the downlink signal 9 are determined by a selection device 24. In selecting the next assignment signal to be transmitted, the selection device 24 can take into consideration, which assignment signals were last transmitted. In the simplest case, only the last transmitted assignment signal respectively is taken into consideration.

For this purpose, the selection device 24 can store, for example, which assignment signal is transmitted, wherein each newly-selected assignment signal is additionally stored in a storage region 24.1. The entries in the storage region 24.1 are then taken into consideration in the selection of a new assignment signal by the selection device 24.

In implementing the method according to the invention, each transmission block with an assignment signal is transmitted via the antenna 22 of the tester 20, this transmitted signal being received by the mobile-telephone device 26 under test by means of its antenna 23. The assignment signal contained in the received signal is evaluated by the mobile-telephone device 26. If it is recognized in this evaluation, that the mobile-telephone device 26 has been addressed by the assignment signal, the mobile-telephone device 26 transmits a message signal in the subsequent transmission block of the uplink signal 10 via the antenna 23.

In the manner already described, the transmission of a message signal is evaluated by the tester 20, a distinction being made between a correctly-recognized assignment signal, an incorrectly-recognized assignment signal and an unrecognized assignment signal. The use of assignment signals for the assignment of several subscribers to transmission blocks of a transmission channel is not restricted to the TDMA (Time Division Multiple Access) scheme illustrated in FIG. 1, but can be used for every system, in which a block-wise assignment of the subscribers takes place in the transmission of messages. In particular, the simultaneous evaluation of unrecognized and incorrectly-recognized assignment signals is also possible in other mobile telephone systems.

While the present invention has been described in connection with a number of embodiments and implementations, the present invention is not so limited but covers various obvious modifications and equivalent arrangements, which fall within the purview of the appended claims.

What is claimed is:

1. A method for determining an error rate of a mobile-telephone device under test with a recognition of an assignment signal for the assignment of one of several mobile-telephone devices of the same transmission channel to a subsequent transmission block of the transmission channel, comprising the steps of:

transmitting a transmission block with an assignment signal;

receiving the assignment signal by the mobile-telephone device under test;

determining by the mobile-telephone device under test whether the subsequent transmission block has been assigned to it by the received assignment signal;

transmitting, by the mobile-telephone device under test, a message signal in the subsequent transmission block, if an assignment has been established;

receiving the message signal from the mobile-telephone device under test in the corresponding transmission block;

checking, after an assignment signal, which addresses the mobile-telephone device under test, whether a message signal from the mobile telephone device under test has been received in the subsequent transmission block;

determining a number of unrecognized assignment signals addressing the mobile-telephone device under test, wherein the assignment signal to be transmitted is selected from an assignment signal addressing the mobile-telephone device under test and at least one other assignment signal addressing another mobile-telephone device of the same transmission signal;

determining a number of assignment signals incorrectly recognized by the mobile-telephone device under test as an assignment, which address other mobile-telephone devices of the same transmission channel; and determining an error rate from the number of assignment signals incorrectly recognized as an assignment.

2. A method according to claim 1, wherein an additional error rate is determined from the number of unrecognized assignment signals addressing the mobile-telephone device under test.

3. A method according to claim 1, wherein an assignment signal for an assignment of a mobile-telephone device to a subsequent transmission block is selected from the assignment signals of all mobile-telephone devices, which use the same transmission channel.

4. A method according to claim 1, wherein a number of transmitted assignment signals, which address the mobile-telephone device under test, is in a determinable ratio to a total number of assignment signals transmitted.

5. A method according to claim 1, comprising selecting an assignment signal relating to the next transmission block dependent upon at least a last, previously-transmitted assignment signal.

6. A tester for determining an error rate of a mobile-telephone device under test with a recognition of an assignment signal for the assignment of one of a plurality of mobile-telephone devices of the same transmission channel to a subsequent transmission block of the transmission channel, the tester comprising:
    a transmitter for transmitting transmission blocks with an assignment signal;
    a receiver for receiving message signals transmitted in subsequent transmission blocks by the mobile-telephone device under test;
    an evaluation device for determining respectively a number of transmission blocks following an assignment signal which addresses the mobile-telephone device under test, in which the mobile-telephone device under test does not transmit a message signal; and
    a selection device for selecting assignment signals for transmission from at least the assignment signal addressing the mobile-telephone device under test and one other assignment signal addressing another mobile-telephone device of the same transmission channel,
    wherein the evaluation device comprises means for determining a number of assignment signals incorrectly recognized by the mobile-telephone device under test as an assignment, which address other mobile-telephone devices of the same transmission channel, and
    wherein the evaluation device comprises means for determining an error rate from the number of assignment signals incorrectly recognized as an assignment.

7. A tester according to claim 6, wherein the evaluation device comprises means for determining an additional error rate from a number of unrecognized assignment signals addressing the mobile-telephone device under test.

8. A tester according claim 6, wherein the selection device selects the assignment signals for transmission from the assignment signals of all mobile-telephone devices of the same transmission channel.

9. A tester according to claim 6, wherein a ratio of the transmitted assignment signals, which address the mobile-telephone device under test, to a total number of transmitted assignment signals is determined via the selection device.

10. A tester according to claim 6, wherein an assignment signal relating to a next transmission block is determined via the selection device dependent upon at least a last, previously-transmitted assignment signal.

11. A method comprising:
    transmitting a transmission block with an assignment signal that assigns a subsequent transmission block to either a first mobile-telephone device or a second mobile-telephone device, where the first mobile-telephone device and the second mobile-telephone device utilize a same transmission channel;
    receiving the subsequent transmission block;
    determining an occurrence of a non-recognition error by the first mobile-telephone device if no message signal from the first mobile-telephone device is received in the subsequent transmission block when the assignment signal assigns the subsequent block to the first mobile-telephone device; and
    determining an occurrence of an incorrect-recognition error by the first mobile-telephone device if a message signal from the first mobile-telephone device is received in the subsequent transmission block when the assignment signal assigns the subsequent block to the second mobile-telephone device.

12. A method according to claim 11, further comprising:
    transmitting a plurality of transmission blocks with assignment signals that assign subsequent transmission blocks to either the first mobile-telephone device or the second mobile-telephone device;
    receiving the subsequent transmission blocks;
    determining a number of incorrect-recognition errors that occur; and
    determining a first error rate from the number of incorrect-recognition errors that occur and a total number of assignment signals transmitted.

13. A method according to claim 12, further comprising:
    determining a number of non-recognition errors that occur; and
    determining a second error rate from the number of non-recognition errors that occur and a total number of assignment signals transmitted.

14. A method according to claim 11, further comprising:
    transmitting a plurality of transmission blocks with assignment signals that assign subsequent transmission blocks to either the first mobile-telephone device or the second mobile-telephone device;
    receiving the subsequent transmission blocks;
    determining a number of non-recognition errors that occur; and determining an error rate from the number of non-recognition errors that occur and a total number of assignment signals transmitted.

15. A method according to claim 11, wherein a number of transmitted assignment signals, which address the first mobile-telephone device, is in a determinable ratio to a total number of assignment signals transmitted.

16. A method according to claim 11, further comprising selecting an assignment signal relating to a next transmission block dependent upon at least a last, previously-transmitted assignment signal.

17. A method comprising:
    transmitting at least one first transmission block with a first assignment signal that assigns a first subsequent transmission block, which is subsequent to the first transmission block, to a first mobile-telephone device that utilizes a same transmission channel as at least one other mobile-telephone device;
    transmitting at least one second transmission block with a second assignment signal that assigns a second subsequent transmission block, which is subsequent to the second transmission block, to the at least one other mobile-telephone device;

determining whether a non-recognition error occurs by determining that no message signal from the first mobile-telephone device is received in the first subsequent transmission block; and determining whether an incorrect-recognition error occurs by determining when a message signal from the first mobile-telephone device is received in the second subsequent transmission block.

* * * * *